(12) United States Patent
Tullis et al.

(10) Patent No.: US 6,246,050 B1
(45) Date of Patent: Jun. 12, 2001

(54) OPTICAL ENCODERS USING NON-PATTERNED TARGETS

(75) Inventors: Barclay J. Tullis, Palo Alto; Mark T. Smith, San Mateo; Larry McColloch, Santa Clara, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/264,063

(22) Filed: Mar. 8, 1999

(51) Int. Cl.[7] .............................. G01N 21/86; G01D 5/34
(52) U.S. Cl. ................................ 250/231.13; 250/559.29
(58) Field of Search ............................. 250/221, 222.1, 250/231.13, 231.14, 231.18, 208.1, 559.29

(56) References Cited

U.S. PATENT DOCUMENTS

| | | |
|---|---|---|
| 4,631,400 * | 12/1986 | Tanner et al. .................... 250/221 |
| 4,794,384 * | 12/1988 | Jackson ........................... 345/166 |
| 5,089,712 | 2/1992 | Holland . |
| 5,149,980 | 9/1992 | Ertel et al. . |
| 5,578,813 | 11/1996 | Allen et al. . |
| 5,644,139 | 7/1997 | Allen et al. . |
| 5,686,720 | 11/1997 | Tullis . |
| 5,703,353 | 12/1997 | Blalock et al. . |
| 5,729,008 | 3/1998 | Blalock et al. . |
| 5,965,879 * | 10/1999 | Leviton ........................... 250/231.13 |

OTHER PUBLICATIONS

Johnson, "Neural Trackball eyes less maintenance", Technology Magazine (publication date not known) (no page numbers).

* cited by examiner

Primary Examiner—John R. Lee

(57) ABSTRACT

An optical encoder can detect relative movement of a target without the use of a systematic pattern on the target. Natural features of different areas of the target are imaged by a photosensor array. The photosensor array generates a sequence of data frames of the imaged areas, and a processor processes patterns in the data frames of the imaged areas to detect a relative motion or displacement of the target. The processor can determine incremental relative motion or rate of relative motion.

23 Claims, 6 Drawing Sheets

FIGURE 1
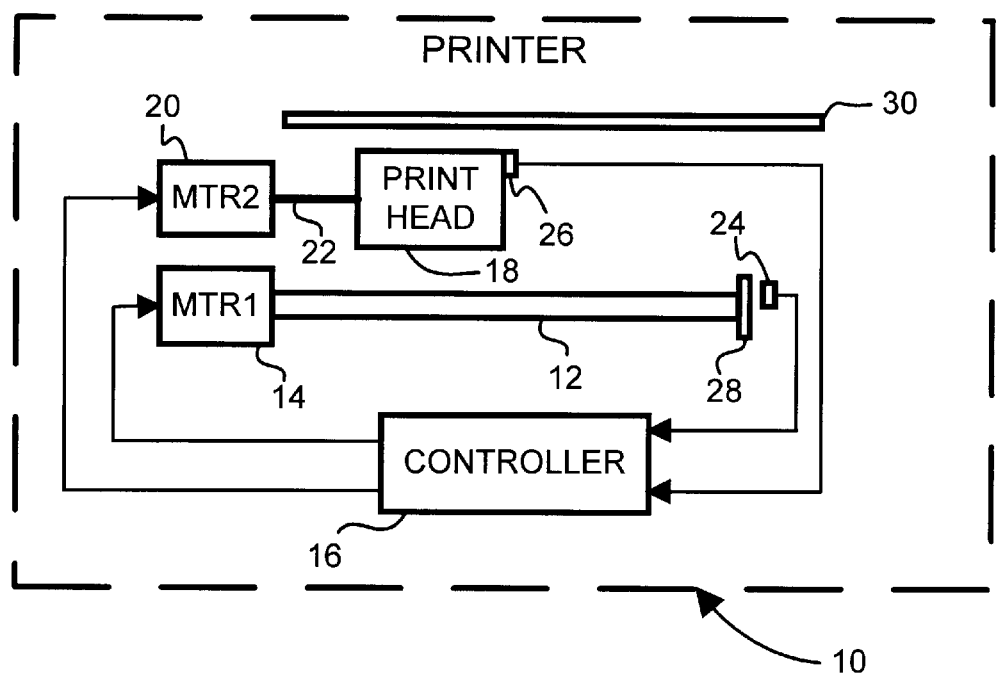
FIGURE 4a
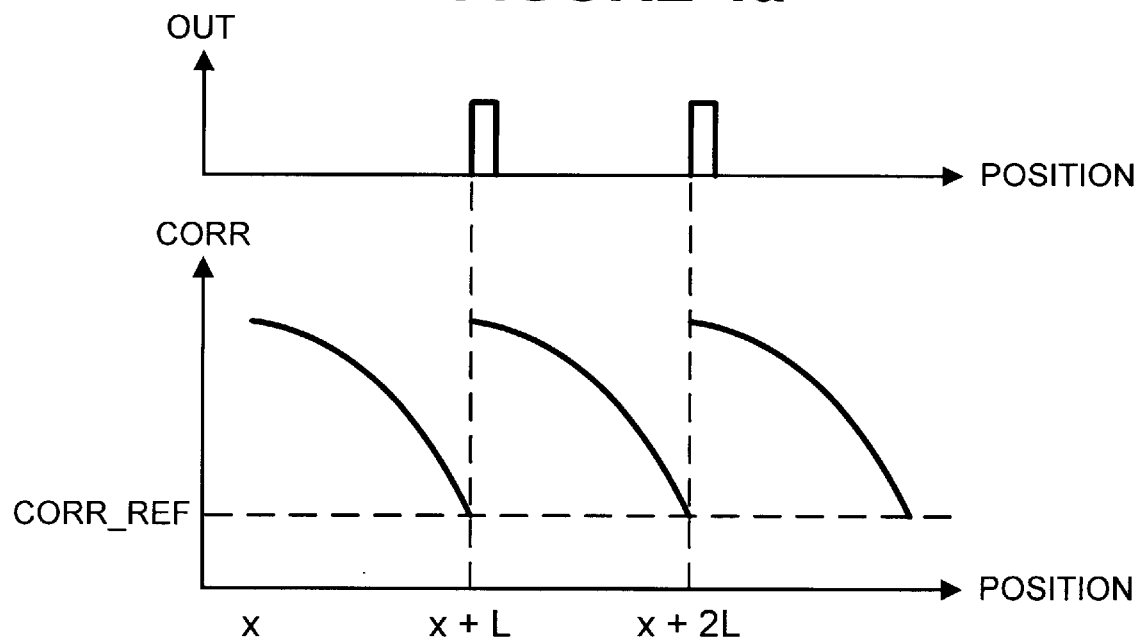
FIGURE 4b

FIGURE 7
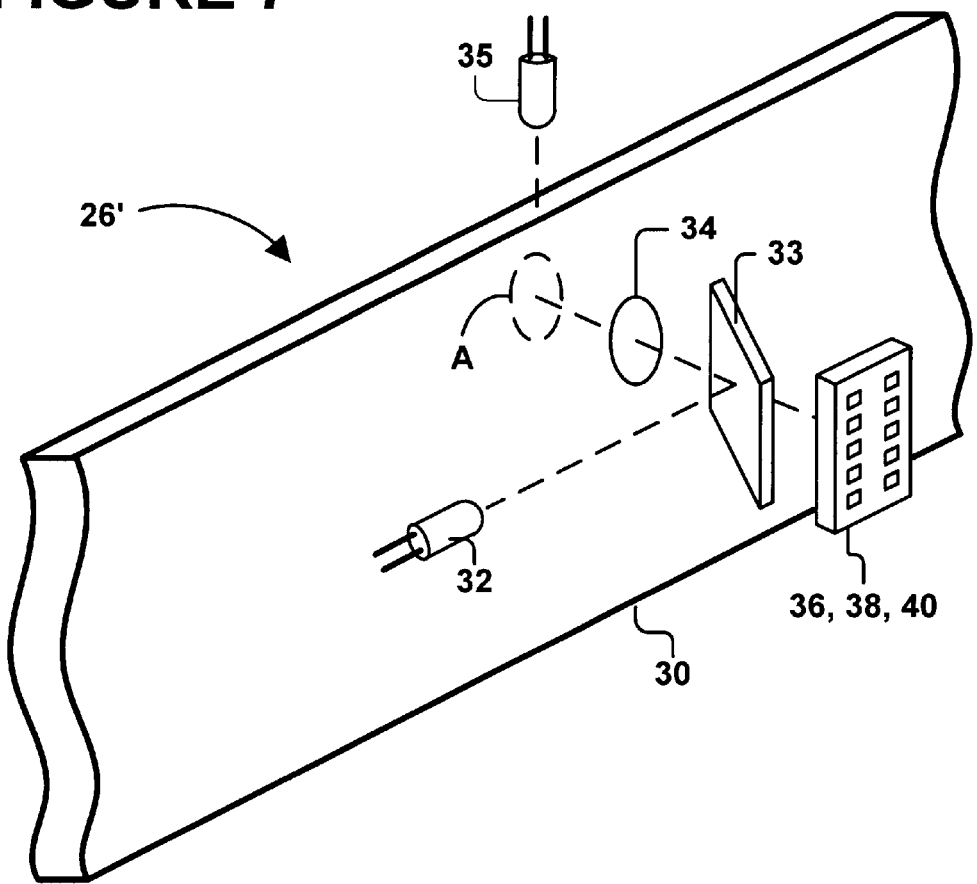
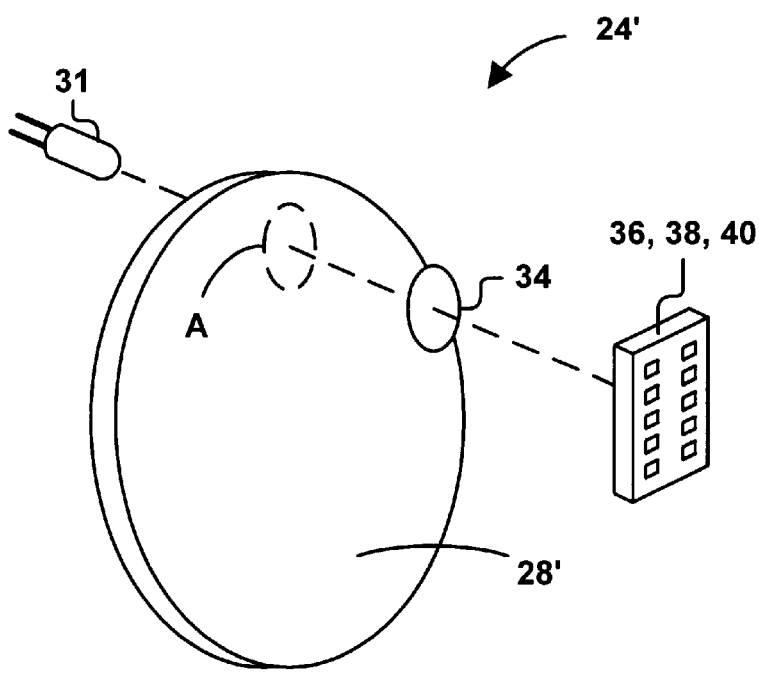
FIGURE 8

US 6,246,050 B1

OPTICAL ENCODERS USING NON-PATTERNED TARGETS

BACKGROUND OF THE INVENTION

The invention relates to motion sensors. More specifically, the invention relates to an optical encoder including a photosensor array.

An inkjet printer typically includes a rotary optical encoder and a linear optical encoder. A patterned encoder wheel of a typical rotary encoder is attached concentrically to a shaft or roller forming a part of a drive mechanism that moves a print medium through the printer. The patterned wheel is typically a thin disc having multiple encoder marks or slots. The marks or slots create a repetitive pattern of radially-extending reflective and non-reflective regions, or opaque and transparent regions, around the disc. When the shaft or roller is rotated to move a sheet of paper or other print medium through the printer, the encoder wheel of the rotary encoder is also rotated.

An encoder assembly of the typical rotary encoder includes one or two photosensor elements, an illuminator and perhaps some filters and lenses. The illuminator is used to illuminate an area of the patterned wheel during the operation of the printer. When the patterned wheel is rotated, the marks or slots pass through the illuminated area. The marks or slots modulate light detected by the photosensor elements at a rate that is proportional to the rate of angular rotation of the patterned wheel. Such modulated light causes each photosensor element to output a train of pulses at a frequency that is proportional to the rate of angular rotation. This feedback information is supplied to a closed loop controller, which controls the feed rate of the sheet.

When two photosensor elements are used, they are typically placed relative to one another such that their output pulses have a quadrature relationship. Such a relationship allows rotation, direction and angular displacements of one-quarter the period of the marks or slots to be detected.

The linear optical encoder is used for detecting and measuring movement of a print head across the print medium. A typical linear encoder includes a patterned encoder strip having alternating marks or slots. The marks or slots create a repetitive pattern of reflective and non-reflective regions, or opaque and transparent regions, along the strip. The typical linear optical encoder further includes an encoder assembly having an illuminator and at least two photosensor elements arranged in a quadrature relationship. The encoder assembly is secured to the print head and is thereby movable relative to the patterned strip. When the print head is moved relative to the patterned strip, the marks or slots modulate light detected by each photosensor elements at a rate that is proportional to the rate of linear movement of the print head. The photosensor elements, in turn, output a train of pulses at a frequency that is proportional to the linear movement of the print head. Feedback information from the encoder assembly is supplied to the closed loop controller, which controls the linear rate or position of the print head.

Patterned targets such as patterned encoder wheels and patterned encoder strips are designed in accordance with certain specifications. These specifications include pitch of the marks or slots and mark/space ratio. Encoder assembly specifications include photosensor element location, how accurately the patterned target is aligned (and centered for rotary encoders), high/low signal ratio, defect density, etc. If any one of these specifications is violated, encoder accuracy might be unacceptable and the optical encoder might not function correctly in a printer.

Using patterned targets increases the cost and difficulty of manufacturing and aligning the encoders. On the other hand, if patterned targets were not required, the encoders would become more robust. Additionally, manufacture and assembly of the optical encoders would be simplified and a changing target could be tolerated. The cost of labor and material would also be reduced. Therefore, eliminating the need for patterned targets would reduce the cost of the optical encoders.

Reducing the cost of the optical encoders, in turn, would reduce the cost of the printers. Mass market products such as printers are extremely cost-sensitive. Reducing the cost by a few pennies might seem trivial, but it can have a significant impact on the profitability of a printer manufacturer, especially a printer manufacturer selling millions of printers per year.

It would be desirable to detect relative motion of a target in an optical encoder without the use of a patterned target.

SUMMARY OF THE INVENTION

Systematically patterned targets are not needed by the present invention, which exploits natural surface features on a target of a machine. According to one aspect of the present invention, natural surface features of the target are imaged by a photosensor array. The photosensor array generates a sequence of data frames of the imaged areas; and the data frames of the imaged areas are processed to detect a relative movement of the target.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 1 is a block diagram of a printer including rotary and linear optical encode according to the present invention;

FIGS. 4a and 4b are illustrations of an output signal and a correlation signal generated by the processor shown in FIG. 3;

FIGS. 7 and 8 are alternative embodiments of the optical encoders according to the present invention;

DETAILED DESCRIPTION OF THE INVENTION

Figure 2:
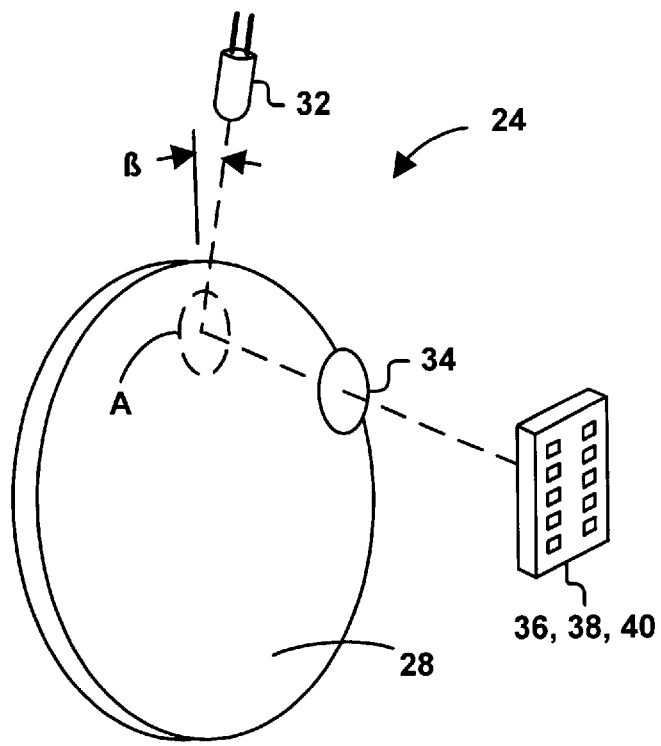
FIG. 2 is an illustration of the rotary optical encoder shown in FIG. 1.

As shown in the drawings for purposes of illustration, the present invention is embodied in an optical encoder associated with a printer. The encoder generates a signal that provides information about relative movement (e.g., relative motion, relative displacement) of a target within the printer, but it provides the information without the use of a patterned target (e.g., a patterned encoder wheel, a patterned encoder strip). Not using the patterned target improves the robustness of the encoder. It also simplifies the manufacture and assembly of the encoder, reduces the cost of labor and material, and, consequently, reduces the cost of the printer.

FIG. 1 shows a printer 10 including a shaft 12, a motor 14 (and gear train) and a controller 16 for the motor 14. During operation of the printer 10, the motor 14 rotates the shaft 12 under control of the controller 16. The shaft 12, in turn, drives a roller (not shown), which feeds sheets of paper through the printer 10. The controller 16 uses feedback information to control the roller rotation position and angular rate and, therefore, the sheet at a desired position and feed rate. The feedback information includes angular position and rate of the shaft 12 and, therefore, the roller and the sheet.

As the sheet is being fed through the printer 10, a print head 18 is moved across the sheet by a second motor 20 (and gear train) and linkage 22 (e.g., a belt drive). The second motor 20 is also controlled by the controller 16. The controller 16 uses feedback information such as linear rate of the print head 18 to control the second motor 20.

A rotary optical encoder 24 and a linear optical encoder 26 provide the feedback information to the controller 16. The rotary encoder 24 does not include a systematically patterned encoder wheel, and the linear encoder 26 does not include a systematically patterned encoder strip. Instead of using a systematically patterned encoder wheel, the rotary encoder 24 utilizes natural surface features on a disc 28 coupled to the shaft 12. Instead of using a systematically patterned encoder strip, the linear encoder 26 utilizes natural surface features on a fixed member 30 that is parallel to the motion of the print head 18. The fixed member 30 could be, for example, a strip or wall of the printer 10.

The natural surface features of the disc 28 and strip 30 may include structural and finish features such as grains, rough texturing, digs, scratches, cracks and other defects in the surface. Other types of natural surface features may include (without limitation) machining marks, surface finish imperfections, surface finish features, and mold and extrusion marks. These natural surface features may be on any surface having visible features that are somewhat random in size, shape and/or position relative to one another. Ideally, the natural surface features will vary in size, shape and position relative to one another. For instance, the natural surface features may be on a bare substrate surface of the disc 28 or strip 30, on an outer surface of a film covering the substrate of the disc 28 or strip 30, on a substrate surface covered by a film, etc. Natural surface features may even include features beneath the substrate surface. Such natural features might be used if, for example, light is transmitted by the disc 28 or strip 30.

The rotary encoder 24 illuminates an area of the disc 28 such that the natural surface features scatter light in many different directions. Resulting is a high number of domains of lightness and darkness that can be imaged. The rotary encoder 24 generates a sequence of data frames of the illuminated surface area. Successive data frames are then processed to determine a relative rotational motion of the disc 28 and the shaft 12.

The linear encoder 26 illuminates an area of the member 30. The resulting domains of lightness and darkness are then imaged by the linear encoder 26. Successive data frames are then processed to determine a relative linear motion of the print head 18.

FIG. 2 shows the rotary encoder 24 in greater detail. The rotary encoder 24 includes an illuminator 32 for generating a beam of light that grazes the disc 28 at a grazing angle $\beta$ and illuminates an area A of the disc 28. The grazing angle $\beta$ is the angle from the surface of the disc 28, or the complimentary angle of the angle of incidence. The light grazing the disc 28 is scattered by the random natural surface features of the surface and produces the high number of domains of lightness and darkness.

The rotary encoder 24 further includes a photosensor array 36, such as a CCD or CMOS device, which captures images of the domains of lightness and darkness. The images could show the entire area A or only a portion thereof. The photosensor array 36 includes multiple pixels arranged in a one or two dimensional array. A lens 34 might be used to image the light from all or part of the illuminated area A onto the photosensor array 36.

Uniform illumination of the surface area A is desirable. The illuminator 32 may include one or more LEDs and integrated or separate projection optics. Such optics might include diffractive optic elements that homogenize the light emitted by the LEDs. Multiple LEDs might allow for a more uniform illumination than a single LED.

The illuminator 32 may instead include one or more lasers or cavity resonant LEDs instead of regular LEDs. The lasers would generate coherent light. The LEDs, in contrast, would generate non-coherent or only partially coherent light.

Choice of characteristics such as wavelength of the light are dependent upon the surface being illuminated, the features being imaged, and the response of the photosensor array 36. The light could be visible, infrared, ultraviolet, narrow band or broadband. A shorter wavelength might be used for exciting a phosphorescing or fluorescing emission from a surface. The wavelength may be selectively chosen if the surface exhibits significant spectral dependence that can provide images having high contrast.

The light could be collimated or non-collimated. Collimated light has been found to work well for grazing illumination in that it provides good contrast in surface features that derive from surface profile geometry (e.g., bumps, grooves) and surface structural elements (e.g., fibers comprising the surfaces of papers, fabrics, woods).

During operation of the rotary encoder 24, grazing light illuminates the area A of the disc 28, and the photosensor array 36 generates a sequence of data frames representing at least a portion of the illuminated area A. As the shaft 12 and disc 28 are being rotated, different natural surface features enter the area A and scatter the light differently. Thus, the domains of light and darkness that are imaged will change as the shaft 12 is rotated. The illuminated area A is a distance r from the center of rotation. Thus, the distance traversed across the photosensor array 36 is r$\theta$, where ($\theta$ us the incremental rotation of the shaft 12.

A processor 38 processes the data frames that are generated by the photosensor array 36. The processor 38 of the rotary encoder 24 determines whether the shaft 12 has been rotated by an angular increment. There are a number of ways in which this can be determined. One such way is for the processor 38 to measure displacements of the shaft 12 by comparing successive images using a correlation method. The processor 38 outputs an electrical pulse each time the shaft 12 has been rotated by the angular increment. The pulses are supplied to the controller 16.

The photosensor array 36 and illuminator 32 are mounted to a printed circuit board (not shown). The printed circuit board and the lens 34 are mounted to the printer 10 in manner that keeps the illuminator 32, the lens 34, and the photosensor array 36 in optical alignment. The mounting is rigid and rugged to ensure that the optical alignment is maintained in a fixed relationship. If the processor 38 is implemented on a separate chip, it too may be mounted to the printed circuit board.

The photosensor array 36 and the processor 38 may be fabricated on separate chips. In the alternative, the processor 38 may be integrated with the photosensor array 36 on a single chip 40.

Figure 3:
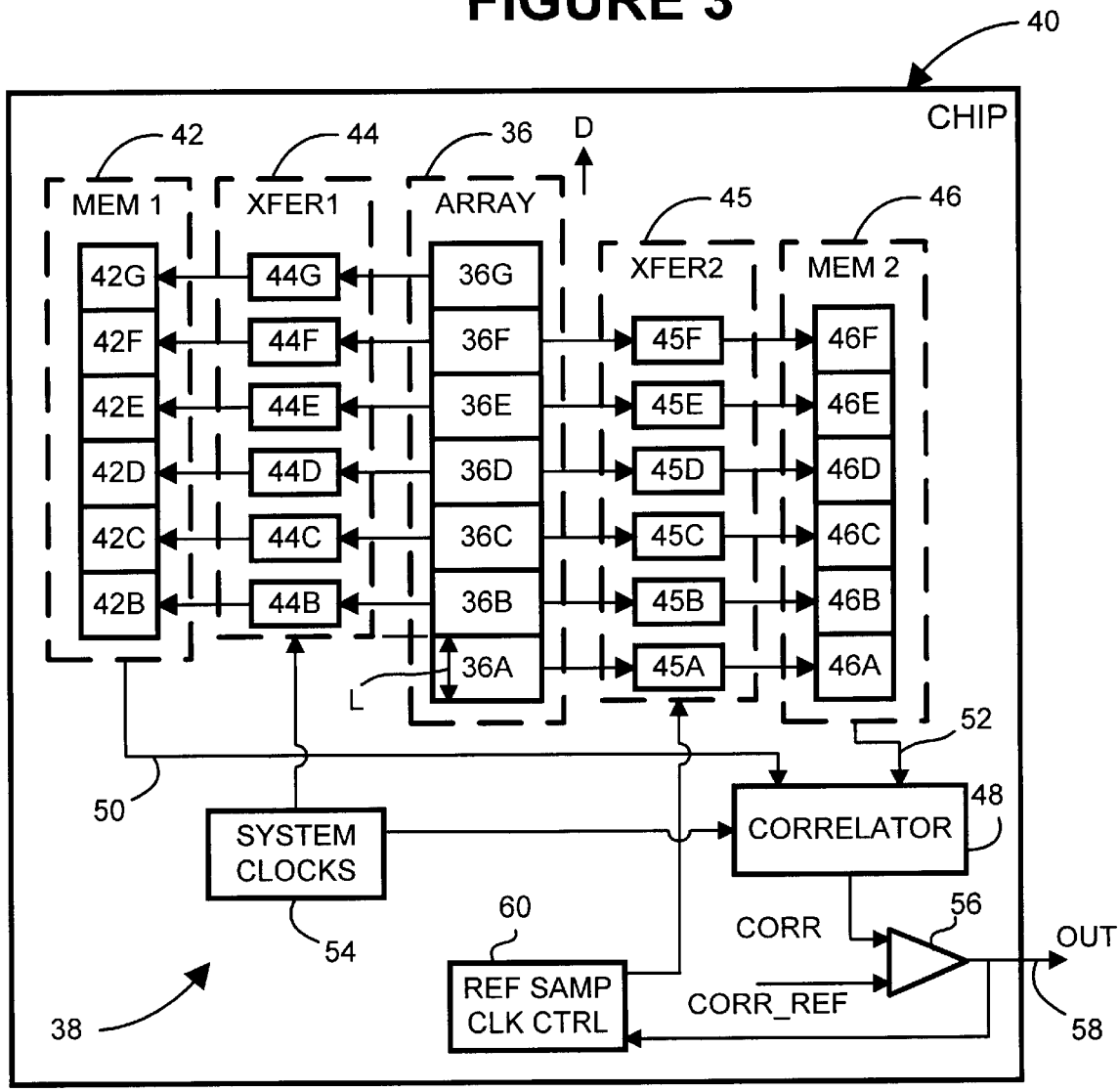
FIG. 3 is a block diagram of an integrated photosensor array and a processor of an optical encoder according to the present invention.

FIG. 3 shows a chip 40 including a processor 38 that is integrated with a photosensor array 36. The photosensor array 36 includes multiple pixels 36A to 36G that are spaced at a regular intervals. The pixels 36A to 36G are all of the same size. Pixel pitch is denoted by the letter L. Seven pixels 36A to 36G in a linear array are shown by way of example.

The pixels 36A to 36G do not discern individual features of the target 28 or 30. The individual features are typically larger than each pixel 36A to 36G. Thus, each pixel 36A to 36G effectively measures an intensity level of a portion of an image or projection of a surface feature within its field of view. Output signals generated by the set of pixels 36A to 36G indicate the contrast variations of the imaged surface features. Thus, a data frame for the photosensor array 36 shown in FIG. 3 includes the seven intensity levels measured by the seven pixels 36A to 36G.

The pixels 36A to 36G typically detect different intensity levels due to random size, shape and distribution of the surface features and a randomness of the scattering by the surface features. As the shaft 12 is rotated or the print head 18 is moved, different features will come into view of the pixels 36A to 36G and intensity levels of the pixels 36A to 36G will change.

Table I provides an example of changing intensity levels in images taken at an initial position x, a second position x+L and a third position x+2L, where x is the initial position of a point within the image or projection of area A, x+L is the position of the point after being moved a distance of one pixel pitch L from the initial position x, and x+2L is the position of the point after being moved a distance of twice the pixel pitch from the initial position x. As the shaft 12 is rotated or the print head 18 is moved, the point x will move across the pixels 36A to 36G in a direction D, which is parallel or tangent to the direction of relative motion between the area A and the photosensor array 36.

It can be seen from Table 1 that the intensity pattern (100, 125, 166, 123, 111) shifts by one pixel pitch L between the initial and second positions, and that it shifts by twice the pixel pitch 2L between the initial and third positions. Thus, the first to fifth pixels 36A to 36E will detect the same intensity levels at the initial position x that the second to sixth pixels 36B to 36F will detect at the second position x+L, and that the third to seventh pixels 36C to 36G will detect at the third position x+2L. This property will be used to determine when the shaft 12 or print head 18 has moved by an incremental amount.

TABLE 1

| Pixel | Position | | |
|---|---|---|---|
| | x | x + L | x + 2L |
| 36A | 100 | 75 | 80 |
| 36B | 125 | 100 | 75 |
| 36C | 166 | 125 | 100 |

TABLE 1-continued

| Pixel | Position | | |
|---|---|---|---|
| | x | x + L | x + 2L |
| 36D | 123 | 166 | 125 |
| 36E | 111 | 123 | 166 |
| 36F | 99 | 111 | 123 |
| 36G | 150 | 99 | 111 |

The values for intensity in Table 1 are exemplary. Moreover, Table I indicates a precise shift of exact length L of the intensity pattern. In reality, however, the intensity pattern might not be shifted in precise increments of length L. Moreover, the intensity values will not match exactly. Other reasons for not matching exactly might include noise, non-linear motion of the area A, and non-uniform illumination.

The processor 38 uses a correlation method to determine when the intensity pattern has shifted by a pixel length L. The processor 38 includes a first memory device 42 including multiple registers 42B to 42G for storing a current intensity pattern. The registers 42B to 42G of the first memory device 42 receive intensity values from the last six pixels 36B to 36G of the photosensor array 36 by way of a first transfer device 44 (which includes elements 44B to 44G). The processor 38 further includes a second memory device 46 including multiple registers 46A to 46F for storing a reference intensity pattern by way of a second transfer device 45 (which includes elements 45A to 45F). The intensity data stored in the second memory device 46 represents a current reference image corresponding to a given position of the shaft 12 or print head 18. This reference image or intensity pattern also represents a predicted intensity pattern of the image after a point within the image of projection of the area A has moved a distance of one pixel pitch L along the photosensor array 36.

At the beginning of a sampling period, the intensity pattern of the last six pixels 36B to 36G is stored in the first memory device 42, and the intensity pattern of the first six pixels 36A to 36F is stored in the second memory device 46. As the shaft 12 is turned or the print head 18 is moved, the first memory device 42 is constantly updated with new intensity patterns from the last six pixels 36B to 36G. The second memory device 46 is not updated as often. When a relative distance of one pixel length has been traversed, the intensity pattern stored in the first memory device 42 will be about the same as the intensity pattern stored in the second memory device 46. Thus, when the image or projection of the area A has moved an angular increment θ (such that arc length rθ equals about a pixel pitch length L) or a linear distance equal the pixel pitch length L, the intensity patterns in the first and second memory devices 42 and 46 will match roughly.

The processor 38 further includes a correlator 48 for determining whether the current intensity pattern stored and read from the first memory device 42 (via path 50) matches the reference intensity pattern stored and read from the second memory device 46 (via path 52). System clocks 54 send clocking signals to the first transfer device 44 and the correlator 48 (first one, then the other) at a rate high enough to ensure that images or projections of the area A have moved only a small fraction of the pixel pitch length L between clocking instances. The correlator 48 may perform a correlation method such as a sum-of-squared-difference analysis on the intensity values in the two memory devices:

$$C=(I_{42B}-I_{46A})^2+(I_{42C}-I_{46B})^2+(I_{42D}-I_{46C})^2+(I_{42E}-I_{46D})^2+(I_{42F}-I_{46E})^2+(I_{42G}-I_{46F})^2$$

where $I^{42n}$ represents the intensity value stored in the $n^{th}$ register of the first memory device 42, $I_{46m}$ represents the intensity value stored in the $m^{th}$ register of the second memory device 46, and C represents the sum-of-squared-difference. An output of the correlator 48 provides a signal CORR indicating the sum-of-squared-difference C.

Additional reference is now made to FIGS. 4a and 4b. If the shaft 12 is not rotated, the intensity patterns stored in the first and second memory devices 42 and 46 will not match, and the correlator signal CORR will be at a high level. As the shaft 12 is rotated or the print head 18 is moved, the intensity levels of the pixels 36A to 36G will change. When the intensity patterns stored in the first and second memory devices 42 and 46 are well matched, the correlator signal CORR will be at a minimum level.

The processor 38 further includes a comparator 56 that compares the correlator signal CORR to a reference signal CORR_REF. The comparator 56 asserts a low voltage level on its output 58 when the correlator signal CORR exceeds the reference signal CORR_REF, and the comparator 56 asserts a high voltage level on its output 58 when the correlator signal CORR falls below the reference signal CORR_REF. The reference signal CORR_REF is chosen by design to lie slightly above the smallest value of the correlator signal CORR.

Whenever the correlator signal CORR transitions from the high level (indicating no match) to the low (indicating a match), the elements 45A to 45F of the second transfer device 45 are triggered by way of the comparator output signal OUT and by way of a reference sample clock controller 60. When the second transfer device 45 is thus triggered or activated, the current pixel values are stored in the second memory device 46. Because the intensity patterns in the two memory devices 42 and 46 will no longer match, the correlator signal CORR will immediately go high again, thereby changing the output signal OUT of the comparator 56 back to the low level. Thus, in a single action, the rising edge of a comparator output pulse OUT is generated and a new reference intensity pattern is stored in the second memory device 46.

Thus, each time the illuminated area A undergoes a relative motion equivalent to one pixel length L in the image space of the photosensor array 36, a pulse OUT is supplied on the output 58 of the processor 38. Each pulse OUT corresponds to an incremental motion $\theta=L/(mr)$ of the shaft 12 or L/m of the print head 18, where m represents the magnification used in the imaging optics.

The actual image distance traveled before a pulse is generated may be determined by the way in which the pixels 36A to 36F are transferred to the second memory device 46. If only the first three pixels were transferred, and the last three pixels were correlated to the reference pattern, a pulse would represent N-3 pixel lengths of motion (where N is the number of rows in the photosensor array 36). Thus, the amount of incremental motion can be made to correspond to multiples of one or more of pixel-pitch-lengths in the image space of the photosensor array 36.

The processor 38 may be designed to detect motion in an opposite direction as well by performing a second correlation operation involving additional transfer and memory elements.

Increasing image contrasts increases signal-to-noise ratio and, therefore, increases measurement accuracy. Increasing the number of domains of lightness and darkness in the detected images without violating the Nyquist criteria (i.e., without causing aliasing) also increases measurement accuracy.

The detectability of some random surface features can be enhanced by utilizing illumination at a grazing angle (i.e., a high incidence angle relative to the surface normal). The grazing angle might be less than 15 degrees for a smooth, finely-textured surface or a slightly rough surface constructed of fibers or particles. These surfaces, unlike polished surfaces, will reveal darker darks under grazing illumination. Generally, higher grazing angles will result in a lower signal-to-noise (SNR) ratio from these surfaces, and lower grazing angles will result in a higher SNR ratio despite a lower signal. The higher SNR will make it easier to observe and detect the random features and will be less prone to errors caused by noise. For a printed surface or one that has many different zones of optical absorption, lower incidence angles (e.g., 30 to 60 degrees) may be used.

The detectability of the natural surface features of the target 28 or 30 can be enhanced by random-like texturing. For example, the targets 28 or 30 could be abraded, sanded, etched or machined.

Figure 6:
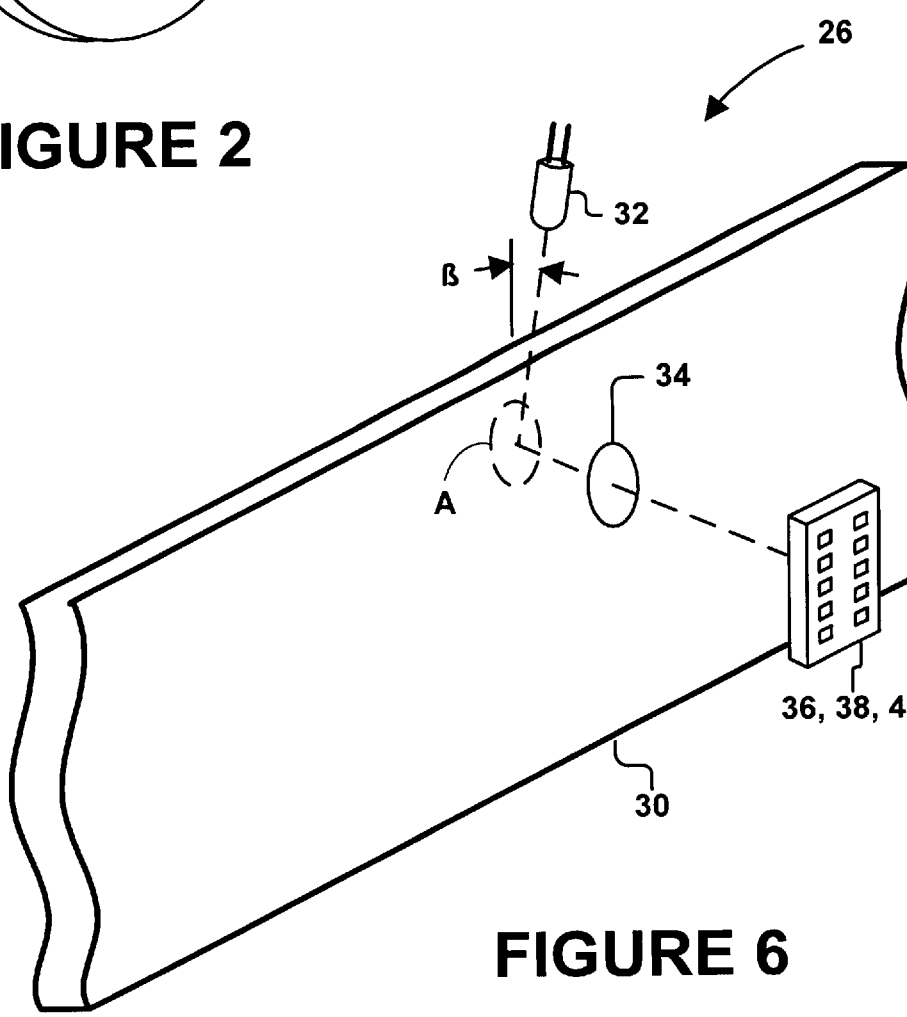
FIG. 6 is an illustration of a linear optical encoder according to the present invention.

FIG. 6 shows the linear encoder 26 in greater detail. The linear encoder 26 also includes an illuminator 32, lens 34 and chip 40 having an integrated detector array 36 and processor 38. However, the illuminator 32, lens 34, detector array 36 and processor 38 of the linear encoder 26 are adapted to image the natural surface features on the fixed member 30. The processor 38 of the linear encoder 26 outputs an electrical pulse when the print head 18 has moved by a known increment. The pulses are supplied to the controller 16 (see FIG. 1).

Thus disclosed are encoders 24 and 26 that do not require the use of systematically patterned targets for detecting relative motion. Eliminating the use of systematically patterned targets simplifies manufacture and assembly, reduces the cost of labor and material and, consequently, reduces the cost of a printer. Particularly effective in reducing cost is the ability to utilize a naturally textured surface of a structural or rotary member that is already part of the printer.

In addition to reducing cost, the targets 28 and 30 of the encoders 24 and 26 are more robust to contamination and surface damage. Eliminating the use of systematically patterned targets also reduces the number of encoder specifications. For instance, eliminating rotational alignment specifications can lead to greater accuracy and precision of angular measurements.

Also disclosed is a processor 38 that uses a correlation technique to generate pulsed, incremental outputs from the use of the targets (member, disc) above. The processor 38 could be wired to correlate pixel movements of one pixel or more than one pixel. However, by bringing correlation type incremental displacement measurements to rotary applications, and by using interpolative sub-sample correlation estimates as well as larger lens magnifications, dead bands between correlations can be significantly reduced.

Figure 5:
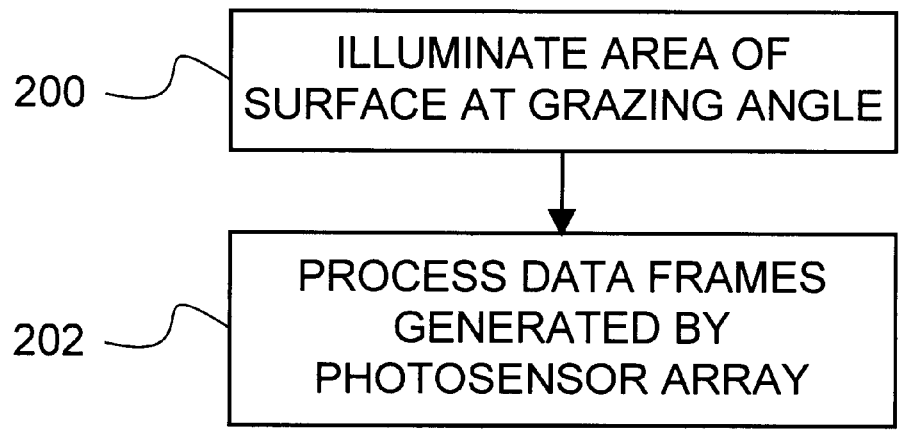
FIG. 5 is a generalized method of performing relative movement detection in accordance with the present invention.

The optical encoders 24 ad 26 are not limited to use in printers. For example, the invention could be applied to scanners, computers, computer peripherals, computer appliances, information appliances and other appliances. The generalized method of FIG. 5 would be applied to these machines as follows: illuminate an area of the target surface such that random, natural surface features within the area can be imaged by the photosensor array 36 (block 200); and process successive data frames generated by the photosensor array 36 to determine a relative movement of the illuminated surface area (block 202).

Moreover, the optical encoders 24 and 26 are not limited to the specific embodiments described above. For example, other correlation algorithms could be used. Other algorithms might include sum of products, normalized sums of products, root-mean-sums-of-squared-differences, normalized sums of squared differences, sums of absolute differences, normalized sums of absolute differences, etc.

Analog or digital approaches for capturing, transferring and storing the images and for computing correlations of the images could be used. The photosensor elements could be read as continuous data or as integrated and sampled data. The transfer devices could utilize sample-and-hold circuits in parallel or could use multiplexing and de-multiplexing circuits for serial operation.

The lens 34 could be a telecentric lens. A telecentric lens gives depth of field while holding magnification constant. Consequently, the telecentric lens relaxes positioning requirement and manufacturing tolerance and focus of the encoder. The lens 34 may be eliminated if the photosensor array 36 can be moved very close to the target 28 or 30 or transmissive illumination can be well-collimated.

For the rotary encoder, the disc 28 is optional. If a portion of a circumference or end face of the shaft 12 is large enough to be imaged, the disc is not needed. However, using the disc to increase the imageable surface will increase accuracy of the relative motion measurement.

The target 28 or 30 could be illuminated by specular illumination. Direct specular illumination could be provided by illumination directed normally onto the area A by way of a beamsplitter 33 (see FIG. 7), or in a complementary arrangement the positions of the illuminator 32 and the photosensor array 36 could be exchanged. An alternative LED 35 could provide edge illumination to fill the thickness of the target 30 with light.

Instead of being made of a reflective material, a target 28' could be made of a transmissive material. For example, the target 28' could be made of clear or translucent plastic. An illuminator 31 would be on one side of the plastic target 28', and the photosensor array 36 would be on an opposite side of the plastic target 28' (see FIG. 8).

The illuminator could be eliminated altogether by using a luminous target such as a self-illuminating target, a phosphorescent target or a fluorescent target. A phosphorescent target has a certain granularity that can be detected, and a fluorescent target has imperfections that can be detected.

Although a photosensor array 36 having a rectilinear array was shown and described above, the photosensor array 36 could instead have a different geometry, such as a circularly symmetric geometry for rotary movement. Polar coordinates would be used to measure the distance moved.

Figure 9:
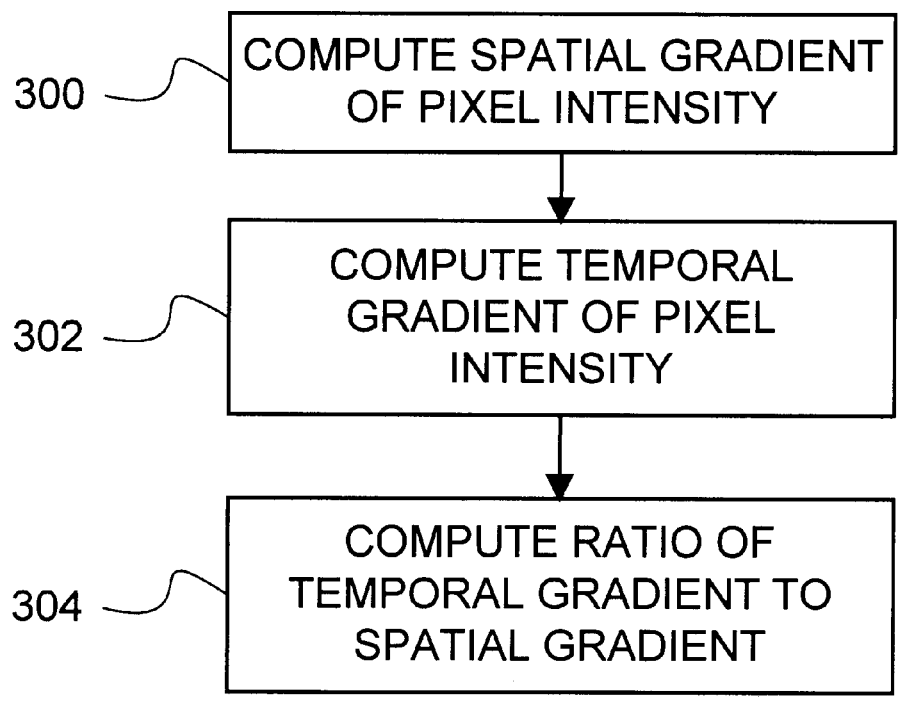
FIG. 9 is a flowchart of a method of performing velocity detection in accordance with the present invention.

Instead of including a processor 38 that indicates incremental motion, the encoders 24 and 26 may include a processor 38' that indicates a rate of motion. The steps taken by such a processor 38' are shown in FIG. 9. The processor 38' measures rate of the target motion by computing a spatial gradient of pixel data (block 300); computing a temporal gradient of pixel data (block 302); and computing a ratio of the temporal gradient to the spatial gradient (block 304). The ratio is indicative of the relative rate of displacement of the target area A on the target 28 or 30.

The spatial gradient could be computed as the average difference in intensity between adjacent pixels in an image, taking the differences in one direction along the column(s) of pixels. The difference distance is the pixel pitch length L. For each pair of adjacent pixels, the processor 38' computes a difference in pixel intensities. Then the processor 38' sums these differences over the six pairs and divides by 6 and divides by L. Thus, the processor 38' computes the average spatial gradient SG taken in one direction as follows:

$$SG = \frac{I_{36A} - I_{36B}}{L} + \frac{I_{36B} - I_{36C}}{L} + \frac{I_{3C} - I_{36D}}{L} + \frac{I_{36D} - I_{36E}}{L} + \frac{I_{36E} - I_{36F}}{L} + \frac{I_{36F} - I_{26G}}{L}$$

where 136A to 136G are the intensity levels of the pixels 36A to 36G. If the pixel length is 25 micrometers and the average spatial intensity difference is 50 units, then the average spatial gradient would be 2.0 micrometers/unit.

The temporal gradient could be computed as the average in the changes of pixel intensities between images in a sequential pair of captured images. For each pixel, the processor 38' determines a difference in intensity value over two consecutive images or data frames, sums these differences over all pixel positions, and divides the intensity difference by the number of pixels in an image and the time between frames. For example, if the average change in pixel intensity value over two consecutive data frames is two units, and the time between two frames is ten microseconds, the average value of the temporal gradient or temporal rate of intensity change is 0.2 units/ microsecond. Dividing the average temporal gradient of 0.2 units/microsecond by the average spatial gradient of 2.0 units/micrometer yields a rate of image displacement of 0.1 micrometers per microsecond.

Figure 10:
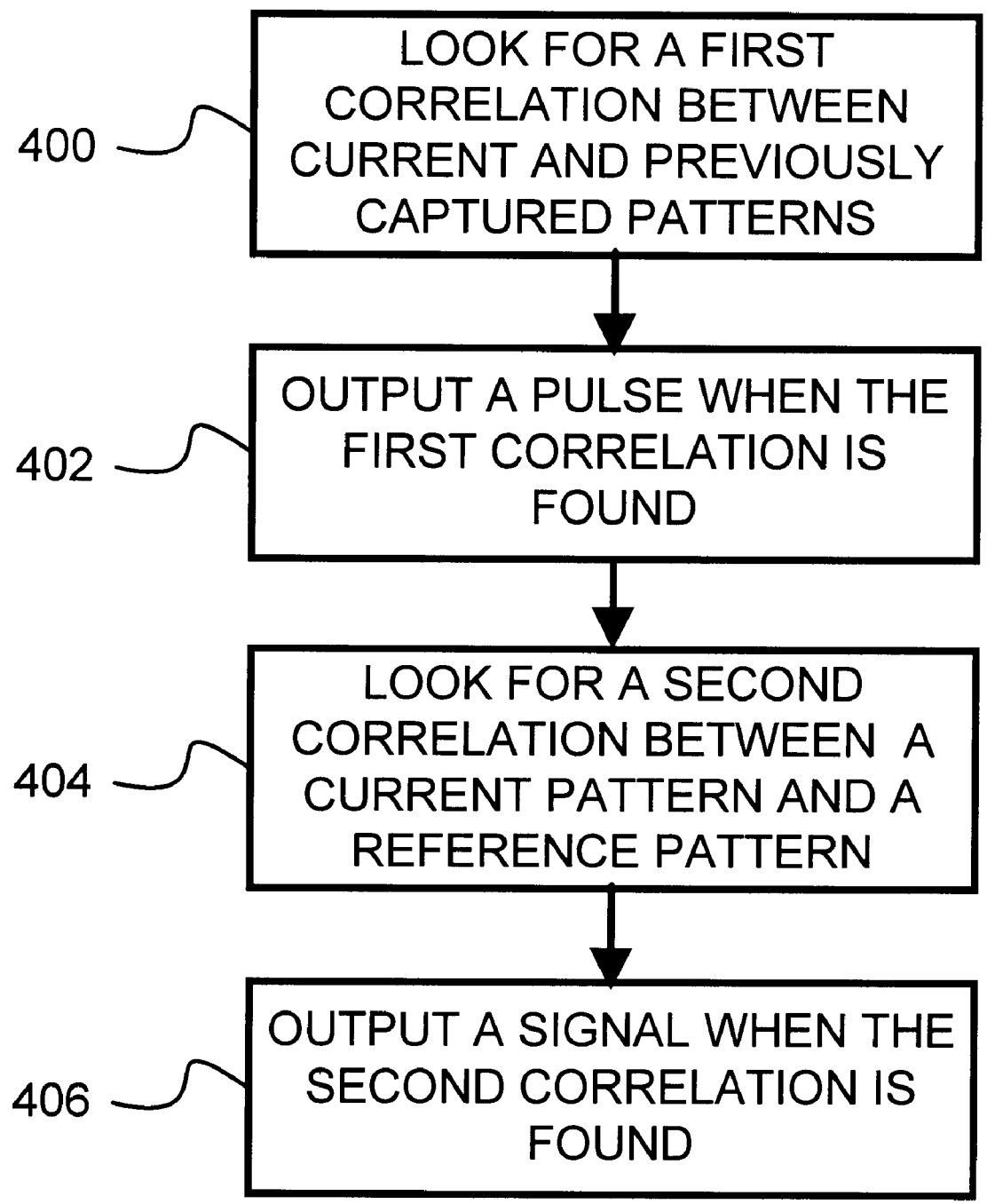
FIG. 10 is a flowchart of a method of performing an absolute measurement in accordance with the present invention.

Although the invention eliminates the need for patterned targets, patterned targets may nevertheless be used. Adding a unique and identifiable pattern to the target (e.g., adding a systematic fabricated pattern that is non-repeating over some maximum travel or over a full revolution) allows absolute measurements to be made. A processor 38" would look for an additional correlation of the fixed pattern on the target with a permanent reference target pattern. Thus, the processor 38" would look for a first correlation between current and previously captured patterns (block 400), output a pulse when a first correlation is found (block 402), look for a second correlation between a current pattern in the data frame and a permanent reference target pattern stored in memory (block 404) and output a signal when the second correlation is found (block 406) (see FIG. 10). An absolute measurement is thereby made when the second correlation is found. One example of a non-repeating absolute reference pattern is a printed density that varies as a sine wave with continuously increasing spatial frequency. This could be printed on top of a random texture. Another example would be a pair of diverging lines over a random field. When used in combination with a processor that generates incremental outputs, adding patterns that continuously change with position can be used to eliminate runout errors in otherwise incremental position measurements.

Accordingly, the invention is not limited to the specific embodiments described above. Instead, the invention is construed according to the claims that follow.

What is claimed is:

1. A method of using a photosensor as an encoder for determining an amount of movement of a target of a machine, a surface of the target having a plurality of natural surface features, the method comprising:

using the photosensor to image the natural surface features of the target, the photosensor generating a sequence of data frames of imaged areas; and processing the data frames of the imaged areas to detect the amount of movement of the target.

2. The method of claim 1, further comprising the step of illuminating the area of the target that is being imaged.

3. The method of claim 2, wherein the area is illuminated by focusing a beam of light onto the surface at a grazing angle.

4. The method of claim 2, wherein the surface is illuminated by collimated illumination.

5. The method of claim 1, further comprising the step of altering the texture of the surface prior to imaging the areas.

6. The method of claim 1, wherein the step of processing the data frames includes the steps of:
   determining patterns from the data frames; and
   correlating the patterns over successive data frames to determine a relative displacement of the target.

7. The method of claim 6, further comprising the step of looking for an additional correlation of a fixed pattern with a pattern on the target, whereby an absolute measurement can be made when the additional correlation is found.

8. The method of claim 1, wherein the step of processing the data frames includes the steps of:
   generating a first pattern from one of the data frames; and
   looking for a correlation between the first pattern and subsequent patterns in the other data frames, whereby relative motion of the target causes the subsequent patterns to be updated;
   wherein a pulse indicating an incremental displacement is generated when a correlation is found.

9. The method of claim 1, wherein the step of processing the data frames includes the steps of:
   computing a spatial gradient of pixel data;
   computing a temporal gradient of pixel data; and
   computing a ratio of the temporal gradient to the spatial gradient, whereby the ratio is indicative of target rate.

10. An encoder for detecting a relative motion of a target of a machine, a surface of the target having a plurality of natural surface features, the encoder comprising:
    a two-dimensional photosensor array for imaging the natural surface features of the target, the photosensor array generating a sequence of data frames of imaged areas; and
    a processor for processing patterns of the natural features in the sequence of data frames, the processor processing the patterns by correlating the patterns of an aggregate of data frames to compute the motion of the target.

11. The encoder of claim 10, further comprising an illuminator for illuminating the imaged areas.

12. The encoder of claim 11, further comprising a telecentric lens located in an optical path between the illuminator and the target.

13. The encoder of claim 10, wherein imaged areas are illuminated at a grazing angle.

14. The encoder of claim 10, wherein the target is luminous.

15. The encoder of claim 10, wherein the processor computes a spatial gradient of pixel data; computes a temporal gradient of pixel data; and computes a ratio of the temporal gradient to the spatial gradient, whereby the ratio is indicative of target rate.

16. The encoder of claim 10, wherein the processor further looks for an additional correlation of a fixed pattern with a pattern on the target; and outputs a signal when the additional correlation is found.

17. The encoder of claim 10, wherein the processor generates a first pattern from one of the data frames-in the sequence; looks for a correlation between the first pattern and subsequent patterns in the other data frames in the sequence, whereby relative motion of the target causes the subsequent patterns to be updated; and outputs a pulse indicating an incremental displacement when a correlation is found.

18. A printer comprising:
    a target;
    means for imaging natural surface features of the target, the imaging means generating a sequence of data frames of the imaged areas; and
    means, responsive to the data frames, for processing patterns of the natural surface features to detect a relative movement between the target and the imaging means, the processing means generating a signal indicating relative movement of the target.

19. The printer of claim 18, wherein the target is rotatable relative to the imaging means.

20. The printer of claim 18, wherein the target is linearly movable relative to the imaging means.

21. The printer of claim 18, further comprising means for illuminating the imaged areas.

22. The printer of claim 21, wherein imaged areas are illuminated at a grazing angle.

23. A processor for a device including a photosensor array for receiving an image of at least a portion of a target, the processor comprising:
    means for receiving a plurality of data frames from the photosensor array
    means for detecting a correlation between first and subsequent patterns in the data frames, wherein relative motion of the target causes the subsequent patterns to be updated; and
    means for generating a pulse when a correlation is found, the pulse indicating an incremental displacement of the target.

* * * * *